United States Patent [19]

Sanzenbacher et al.

[11] 4,270,740
[45] Jun. 2, 1981

[54] APPARATUS FOR PRODUCING MOLTEN IRON BY SUBMERGED COMBUSTION

[75] Inventors: Charles W. Sanzenbacher, Charlotte, N.C.; John C. Scarlett, Toledo, Ohio

[73] Assignee: Midrex Corporation, Charlotte, N.C.

[21] Appl. No.: 156,850

[22] Filed: Jun. 5, 1980

Related U.S. Application Data

[62] Division of Ser. No. 58,037, Jul. 16, 1979, Pat. No. 4,238,226.

[51] Int. Cl.³ .............................................. F27B 15/00
[52] U.S. Cl. .................................. 266/157; 266/162; 266/166; 266/188
[58] Field of Search ............... 266/157, 162, 175, 166, 266/188, 195

[56] References Cited

U.S. PATENT DOCUMENTS

| | | | |
|---|---|---|---|
| 2,923,615 | 2/1960 | Pearce | 266/175 |
| 3,990,886 | 11/1976 | Sunter | 75/25 |
| 4,007,034 | 2/1977 | Hartwig et al. | 75/38 |
| 4,045,214 | 8/1977 | Wetzel et al. | 75/38 |
| 4,223,876 | 9/1980 | Weigel et al. | 266/166 |

*Primary Examiner*—M. J. Andrews
*Attorney, Agent, or Firm*—Ralph H. Dougherty

[57] ABSTRACT

Apparatus for reducing particulate iron oxide and producing molten iron in which coal and oxygen are injected into a molten iron bath to melt the iron, gasify the coal and produce a hot off-gas which is then used as the reductant in a counterflow shaft furnace to reduce iron oxide pellets and/or natural ore in a continuous manner. The hot reduced iron product from the shaft furnace is discharged directly into the molten iron bath from which the molten iron product is discharged.

10 Claims, 1 Drawing Figure

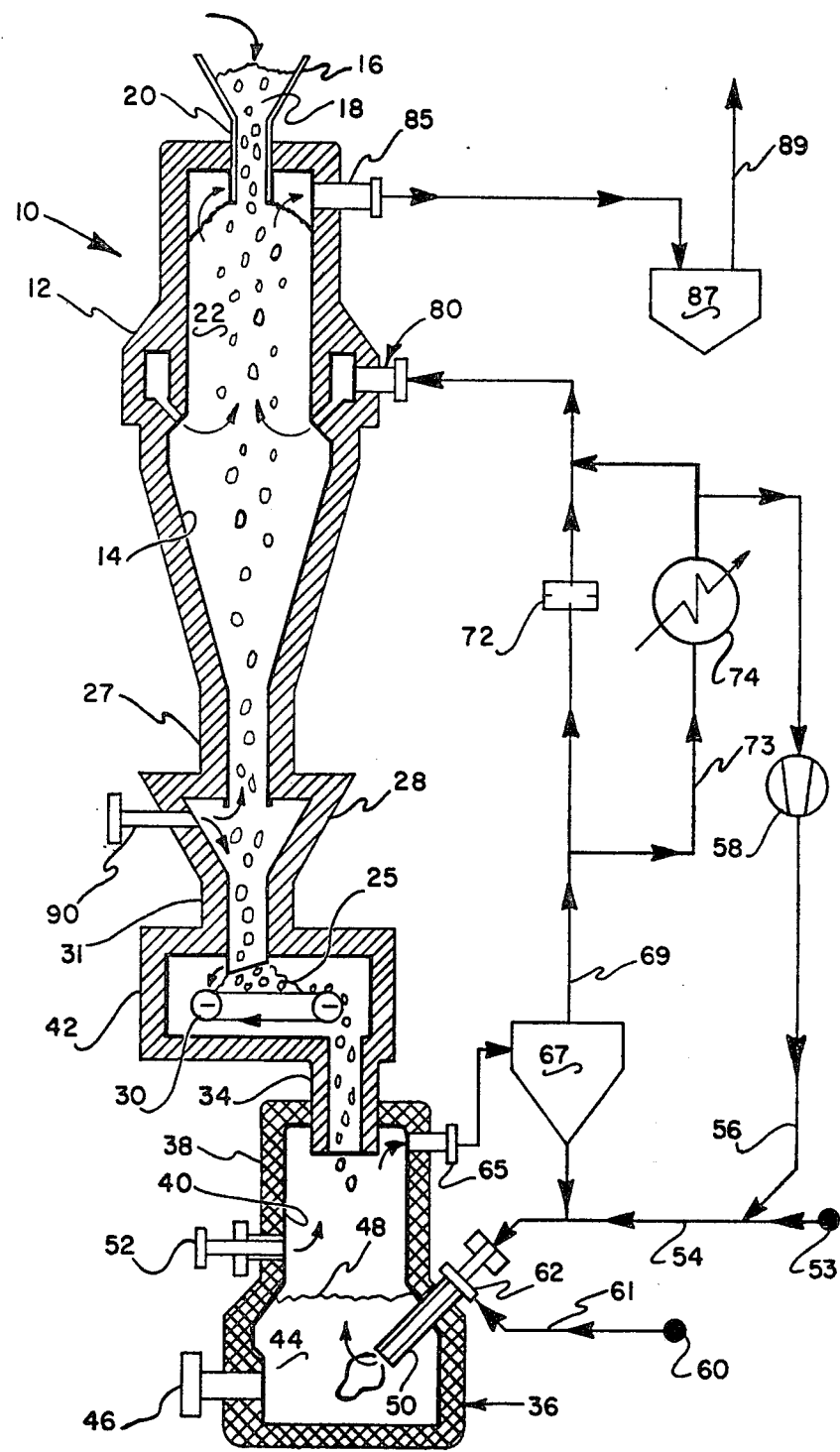

4,270,740

APPARATUS FOR PRODUCING MOLTEN IRON BY SUBMERGED COMBUSTION

This is a division of application Ser. No. 058,037, filed July 16, 1979, now U.S. Pat. No. 4,238,226.

BACKGROUND OF THE INVENTION

The direct reduction of iron oxide to metallic iron has become a worldwide reality, and direct reduced iron is a commercially accepted feed material in steelmaking.

Direct reduced iron, or sponge iron, is particularly well suited for electric arc furnace technology. It is not well suited as the principal feed material for other steelmaking furnaces, such as the bottom blown oxygen process, which require hot metal or molten metal, as feed material. At present, such hot metal is produced commercially only by means of blast furnaces which are inherently economically restricted to the availability of coking coal and to integrated steelmaking installations. It is, therefore, desirable to produce molten iron by direct reduction means which are economically suitable for small steelmaking plants and are independent of the use of coking coal.

The present invention accomplishes this end by (a) producing hot particulate direct reduced iron from particulate iron oxide in an efficient counterflow shaft furnace, (b) discharging the hot particulate iron into a melter containing a bath of molten iron, (c) injecting coal and oxygen into the molten bath to supply heat to melt the particulate iron and gasify the coal, and (d) introducing the hot melter off gases into the shaft furnace to reduce the iron oxide. The process is simple, efficient, nonpolluting, economical for small steelmaking installations, and suitable for use with noncoking coals which are available worldwide.

OBJECTS OF THE INVENTION

It is the principal object of the present invention to provide a method for directly reducing particulate iron oxide to molten iron wherein solid fuel is utilized as the reductant source.

It is another object of the invention to provide an energy efficient method for converting particulate iron oxide to molten iron in counterflow heat exchange by reaction with gaseous reductants produced from solid fuel and oxygen.

It is another object of the invention to provide a method for producing molten iron from particulate iron oxide in a simple once-through process without removing carbon dioxide and sulfur constituents from the reductant gases.

It is another object of the invention to provide a method for simultaneously producing molten iron and a clean gaseous fuel of high heating value.

It is also an object of this invention to provide apparatus for carrying out the above methods.

BRIEF DESCRIPTION OF DRAWING

The present invention will be more readily understood by referring to the following detailed description and the appended drawing in which:

the single FIGURE is a schematic drawing of a shaft furnace, melting vessel and related equipment in accordance with the present invention.

DETAILED DESCRIPTION

Referring now to the drawing, a shaft furnace 10 has a steel shell 12 lined with refractory 14. A feed hopper 16 is mounted at the top of the furnace 10 for charging particulate feed material 18 therein. The feed material, consisting of iron oxide in the form of pellets or lumps, descends by gravity through one or more feed pipes 20 to form a packed bed 22 or burden of particulate iron oxide feed material in the furnace 10. Reduced iron 25 in solid particulate form passes through seal pipe 27 into sealing chamber 28. Discharge conveyor 30 controls the rate of descent of the burden through furnace 10 and the flow rate through discharge pipe 31. Discharge conveyor 30 acts as the primary iron-bearing solids metering device for the entire process.

Particulate reduced iron product 25 falls freely from discharge conveyor 30 through radiation shield pipe 34 into melter-gasifier vessel 36 which has a steel shell 38 lined with refractory 40. Radiation shield pipe 34 serves to minimize heat radiation from the melter-gasifier vessel 36 to the discharge conveyor chamber 42 and prevents reduced iron solids from overheating and becoming sticky and non-free-flowing. The temperature in vessel 36 is several hundred degrees above the temperature in chamber 42.

Reduced particulate material 25 falls into molten bath 44 and is melted. The molten iron product is removed from vessel 36 through iron notch 46. If desired, a slag taphole, not shown, can be provided at an elevation higher than iron notch 46 so that only molten iron is removed through the iron notch. Molten iron and slag are intermittently removed from vessel 36 to maintain a liquid level 48 above the discharge end of coal and oxygen injection pipes 50 (only one of which is shown) and below water injection pipes 52 (only one of which is shown). The elevation of liquid level 48 is not critical but only dependent upon the design of vessel 36 and the vertical distance between the elevation of pipes 50 and 52. It is desirable to minimize the liquid level elevation above the outlet of pipe 50 in order to keep the pressures at which coal and oxygen must be compressed for injection as low as possible.

In operation, all iron bearing materials descend in gravitational flow from the feed hopper 16 to iron notch 46. All non-iron-bearing materials ascend through the melter-gasifier 36 and the shaft furnace 10 in counterflow relationship to the descending iron bearing materials. This permits efficient use of energy for producing molten iron from coal and oxygen by a simple method.

Referring again to the drawing, the flow of non-iron-bearing material is as follows. Pulverized coal or other carbonaceous material is pneumatically conveyed from source 53 through pipe 54 and injector pipes 50 into melter-gasifier 38 by a small stream of compressed gas from pipe 56. Preferably, process gas is compressed by compressor 58 and used as the conveying media. The powdered coal is injected through a center pipe of injection pipes 50 and into molten bath 44 at a point below the elevation of liquid level 48. Oxygen from source 60 is compressed to a suitable pressure then injected through an annular pipe 62 surrounding injection pipe 50 so that oxygen and powdered coal streams meet at the exits of their respective pipes at the discharge of injection pipes 50 and 62. Coal is combusted with oxygen within molten bath 44. The combustion of coal and oxygen is exothermic, and sufficient heat is released to melt the hot particulate material 25 within the bath. The ratio of coal to oxygen is controlled to cause combustion to occur at a theoretical adiabatic flame temperature of about 1950° C. The quantity of coal combusted is controlled according to the quantity of reduced particulate material as measured by means of discharge conveyor 30. The ratio of coal to reduced particulate material is adjusted to maintain the proper quantity of melter-gasifier off-gas to reduce all iron oxide to metallic iron in furnace 10.

Hot, reductant-rich off gas leaves the molten bath 44 at a temperature of about 1400° C. The quality (ratio of reductants to oxidants) and temperature of the gas are both higher than desirable for use in the shaft furnace. Therefore, liquid water is preferably injected through water nozzles 52 to reduce the off gas temperature to about 1200° C. and humidify the hot off gas to obtain the desired gas quality for reduction purposes. The humidified off gas is removed from the melter-gasifier 36 through outlet pipe 65. Hot solids are separated from the humidified off gas in a cyclone separator 67. The separated solids may be recycled to the melter-gasifier by injecting them through pipe 68 into pipe 54 with the pulverized coal.

Off gas leaving the cyclone separator 67 through pipe 69 is further cooled to obtain the desired temperature of gas for reduction purposes. Hot gas passes through a restrictive orifice 72 which forces a controlled quantity of hot gas through pipe 73 and water-cooled heat exchanger 74. A portion of the cooled gas is diverted to pipe 56 to provide compressed gas for coal injection. The remainder of the cooled stream of by-passed gas is recombined with the hot stream of gas. The temperature of the combined reducing gas is controlled by automatically adjusting the flow of cold by-passed gas. Heat exchanger 74 may be of the direct or indirect type. No steam is required for the process; however, if it is desirable to generate steam for use elsewhere, a waste heat boiler may be used. If steam generation is not desired, a simple direct water cooler may be used for heat exchange.

The recombined reducing gas, having the desired temperature, quality, and quantity for reduction, enters the shaft furnace 10 through a bustle and tuyere system 80. The reducing gas flows inward and upwards through the descending burden 22 to heat the particulate iron oxide and reduce it to metallic iron. In the reaction of reducing iron oxide to iron, the reducing gas becomes partially oxidized and cooled. This partially oxidized and cooled gas leaves the shaft furnace 10 through furnace off-gas outlet pipe 85 and is further cooled and scrubbed free of dust in water cooled scrubber 87. Cool, clean furnace off gas exiting scrubber 87 in pipe 89 contains CO and $H_2$ and has a heating value of about 1900 Kcal/$Nm^3$. This is a valuable gaseous fuel for use in a steel mill, or elsewhere.

Oxygen and coal are introduced into the melter-gasifier 36 at sufficiently high pressure to overcome the pressure drop created by the flow of gases through the melter-gasifier and shaft furnace systems, and to deliver off gas fuel at a usable pressure. The pressure in gasifier-melter 36 is higher than in shaft furnace 10; therefore, a quantity of cold inert gas is introduced through inlet pipe 90 into a sealing chamber 28 between seal pipe 27 and furnace discharge pipe 31. The chamber pressure is maintained slightly higher than the pressure in the bottom of the shaft furnace 10 and in discharge conveyor chamber 42 so that some cold inert seal gas flows upwards into shaft furnace 10 and downwards into discharge conveyor chamber 42. This prevents 1200° C. gases from the melter-gasifier from flowing directly upwards into the bottom of the shaft furnace.

To demonstrate the practicability of the invented process we have developed a process analysis which is summarized in Tables 1, 2 and 3. The analysis is based on use of a typical Western U.S.A. sub-bituminous coal as the carbonaceous material.

Reducing gas quality is defined as the ratio of reductants (CO plus $H_2$) to oxidants ($CO_2$ plus $H_2O$) in the gas mixture. In order to take full advantage of the inherent chemical efficiency of a counterflow shaft reduction furnace, the quality of the hot reducing gas should be at least about 8.

Operation temperatures in a shaft furnace vary between 760° and 900° C., and depend on the specific particulate iron oxide material being reduced. A practical operating temperature for most materials is 815° C.

TABLE 1
GAS FLOWS AND TEMPERATURES

| ITEM | REFERENCE NUMERAL | FLOW IN $Nm^3$* | GAS QUALITY | GAS TEMPERATURE °C. |
|---|---|---|---|---|
| Oxygen | 61 | 576 | — | 50 |
| Melter-Gasifier gas | 48 | 1869 | 16.9 | 1400 |
| Humidified Melter-Gasifier gas | 65 | 2014 | 8.0 | 1200 |
| By-passed gas | 73 | 741 | 8.0 | 60 |
| Reducing gas | 80 | 1983 | 8.0 | 815 |
| Furnace off gas | 85 | 1983 | 1.4 | — |
| Clean off gas fuel | 89 | 1850 | — | 60 |

*$Nm^3$ - normal cubic meters

TABLE 2
FEED AND ENERGY REQUIREMENTS

| ITEM | REFERENCE NUMERAL | FLOW IN $Nm^3$ | FEED IN kg | ENERGY IN Gcal |
|---|---|---|---|---|
| Coal | 54 | — | 1055 | 6.71 (HHV) |
| Oxygen | 61 | 576 | — | 1.01* |
| Oxide | — | — | 1420 | — |
| Humidifying water | 52 | — | 117 | — |
| Off gas fuel | 89 | 1850 | — | (3.47) |
| Net energy required | — | — | — | 4.25 |

*Energy (HHV) of coal required to produce 576 $Nm^3 O_2$ at 30% efficiency.

Because of the chemical thermodynamics involved in the reduction of iron oxide to metallic iron, only a portion of the initial reductants (CO plus $H_2$) can be reacted before the oxidants ($CO_2$ plus $H_2O$) which are formed cause the reduction reactions to cease. This thermodynamic situation results in the spent reducing gas leaving the shaft furnace through outlet 85 having a quality of about 1.5 for an efficiently operating furnace. Therefore, reducing gas with a quality of 8 is oxidized to a quality of 1.5 in the reduction process. The amount of CO plus $H_2$ thus consumed determines the quantity of reducing gas required. A reducing gas quantity of 1800 to 2100 $Nm^3/t$ of reduced iron product is practical for efficient operation.

Each ton of molten iron product discharged from the melter-gasifier 36 requires that 1.035 tons of direct reduced particulate material be charged into the melter-gasifier. Typical metallization of direct reduced material will be 92%. Material is delivered to the melter-gasifier at 700° C. Molten iron product is discharged at 1350° C.

Therefore, sufficient heat must be generated in the melter-gasifier to heat the 700° C. incoming direct reduced material to 1350° C., reduce residual FeO to iron, reduce $SiO_2$, MnO, $P_2O_5$, etc., increase carbon, heat slag materials to 1350° C., and satisfy heat losses from the system. This requires 403,000 Kcal/t of molten iron product. The heat required is furnished by the exothermic reaction of coal and oxygen within the melter-gasifier and cooling the products of combustion to 1400° C. Table 3 shows gas analyses at the indicated positions in the process.

TABLE 3

| ITEM | GAS ANALYSES THROUGHOUT PROCESS | | | | | |
|---|---|---|---|---|---|---|
| | REFERENCE NUMERAL | % CO | % $CO_2$ | % $H_2$ | % $H_2O$ | % $N_2$ |
| Melter-gasifier gas | 48 | 66.9 | 2.3 | 26.2 | 3.2 | 1.4 |
| Reducing gas | 80 | 63.0 | 2.2 | 24.7 | 8.8 | 1.3 |
| Furnace off gas | 85 | 36.6 | 28.1 | 21.7 | 12.3 | 1.3 |
| Clean off gas fuel | 89 | 38.8 | 29.8 | 23.0 | 6.0 | 2.4 |

SUMMARY

The present invention is a counterflow continuous process and apparatus which efficiently uses noncoking solid fuels to produce molten iron from particulate iron oxide while simultaneously producing valuable gaseous fuel.

What is claimed is:

1. Apparatus for reducing particulate iron oxide and producing molten iron comprising:
    (a) a generally vertical shaft furnace having means for admitting particulate burden material at the top thereof and means for removing particulate material from the bottom thereof, means intermediate the ends of the furnace for introducing a hot reducing gas to the burden therein, and means for withdrawing spent reducing gas from the top thereof;
    (b) a melter-gasifier vessel having a molten metal bath therein, means for admitting particulate materials to the top thereof, heating means for melting said particulates in said vessel and means for withdrawing molten product from said vessel, said vessel being in sealed relationship with the discharge end of said shaft furnace;
    (c) conduit means for introducing oxygen and fossil fuel into said bath beneath the surface of said bath;
    (d) gas humidifying means in the wall of said vessel above the molten metal bath for cooling and humidifying gases from said bath within said vessel; and
    (e) a gas passageway communicating with said vessel and said hot gas introducing means in said furnace.

2. Apparatus according to claim 1 wherein said conduit means for introducing oxygen and fossil fuel into said bath comprises a dual passageway pipe having a central fossil fuel passageway surrounded by an annular oxygen passageway.

3. Apparatus according to claim 1 further comprising means for controlling the rate of feed of reduced particulate material to said melter-gasifier vessel.

4. Apparatus according to claim 1 further comprising means in said gas passageway for removing particulate material therefrom.

5. Apparatus according to claim 4 wherein said means for removing particulate material is a hot gas cyclone.

6. Apparatus according to claim 4 further comprising a solids return pipe communicating with said particulate removal means and with said fossil-fuel introducing means for returning removed particulates to said vessel.

7. Apparatus according to claim 1 further comprising means communicating with said gas passageway and said fossil fuel conduit for introducing a portion of said hot gas to said fossil fuel conduit to assist in introducing fossil fuel to said vessel.

8. Apparatus according to claim 1 further comprising means communicating with said gas passageway for reducing the temperature of said hot gas.

9. Apparatus according to claim 8 wherein said temperature reducing means comprises a restrictive gas flow orifice in said gas passageway, and a gas by-pass pipe connecting said passageway on each side of said orifice, and a by-pass cooler in said by-pass pipe.

10. Apparatus according to claim 1 further comprising cleaning means communicating with said spent reducing gas withdrawal means for cleaning the spent reducing gas withdrawn from said shaft furnace.

* * * * *